United States Patent [19]

Suzuki

[11] Patent Number: 4,679,660

[45] Date of Patent: Jul. 14, 1987

[54] MECHANISM FOR AUTOMATICALLY STORING SWING ARMS USED FOR APPARATUS FOR LIFTING AUTOMOBILES FOR REPAIR

[75] Inventor: Koichi Suzuki, Aichi, Japan

[73] Assignee: Sugiyasu Industries Co., Ltd., Aichi, Japan

[21] Appl. No.: 887,991

[22] Filed: Jul. 18, 1986

[30] Foreign Application Priority Data

Aug. 3, 1985 [JP] Japan .......................... 60-133829[U]

[51] Int. Cl.[4] .............................................. B60S 13/00

[52] U.S. Cl. .................................. 187/8.41; 187/8.67; 254/89 R

[58] Field of Search .................... 187/8.41, 8.75, 8.67, 187/8.74, 8.61; 254/89 R, 89 H, 91, 2 R, 2 B, 93 R; 414/628, 630, 633

[56] References Cited

U.S. PATENT DOCUMENTS 4,084,790 4/1978 Molnar .............................. 187/8.47

FOREIGN PATENT DOCUMENTS 2064243 1/1973 Fed. Rep. of Germany ..... 187/8.41

*Primary Examiner*—Joseph J. Rolla
*Assistant Examiner*—Kenneth Noland
*Attorney, Agent, or Firm*—Lahive & Cockfield

[57] ABSTRACT

In a car lift apparatus including a pair of spaced apart posts each having a vertically-movable carriage, a pair of swing arms pivotally connected to the carriage for swinging movement each comprises a hollow support arm element connected to a pivotal pin of the carriage and a telescopic hollow arm element supported by and slidable in the former arm element. The latter arm element has a hollow cylinder therein, while the former arm element includes a hollow piston rod therein which has one end thereof in the cylinder. A piston is connected to the end of the piston rod in the cylinder. The hollow piston rod is connected, at its other end, to an air compressor located outside the lift apparatus. The piston rod is also connected, at its same end, to the carriage by means of a chain which engages a portion of the pivotal pin, to which is connected the support arm element, at a portion of the middle section of the chain.

2 Claims, 7 Drawing Figures

MECHANISM FOR AUTOMATICALLY STORING SWING ARMS USED FOR APPARATUS FOR LIFTING AUTOMOBILES FOR REPAIR

FIELD OF THE INVENTION

This invention relates to a mechanism for automatically storing swing arms used for an apparatus for lifting automobiles for repair.

BACKGROUND OF THE INVENTION

Conventionally, in the apparatus for lifting automobiles for repair, the representative ones of which are those of two-post and gate-shaped types, a vertically movable carriage connected to a support such as a post has been provided with a pair of swing arms pivotally connected to the carriage for horizontal movement. The angle between the swing arms may be adjusted according to the size of the automobile. Usually each swing arm comprises two or three individual arm elements telescopically connect to each other or one another. Thus, when the car is to be lifted, the telescopic element or elements are extended, and when the car is to be removed, these elements are retracted and the entire swing arm is swung to the side of the post. Heretofore, these operations have all been performed manually, taking much time and trouble. Also, in the representative case where car lifting is performed between two posts, the personnel must make advance toward the front and rear of the car, after the car has been lowered, in order to store or move aside the swing arms. In such a case, therefore, the work has been performed with a very low efficiency. Accordingly, the present invention obviates these prior art problems by making possible an automatic storage of the swing arms.

SUMMARY OF THE INVENTION

An object of the invention is to provide a mechanism for automatically storing swing arms used for an apparatus for lifting automobiles for repair.

Another object of the invention is to provide an apparatus for lifting automobiles for repair which is particularly useful where it is desired to repair continuously a number of automobiles with a higher efficiency.

The present invention achieves these objects by making improvements in a swing arm comprising a hollow support arm element and a telescopic arm element slidable in the hollow support element which is well known in the art.

Additional objects of the invention will become apparent upon consideration of a detailed description of the invention which will follow.

DETAILED DESCRIPTION OF THE PREFERRED EMBODIMENT

Figure 1:
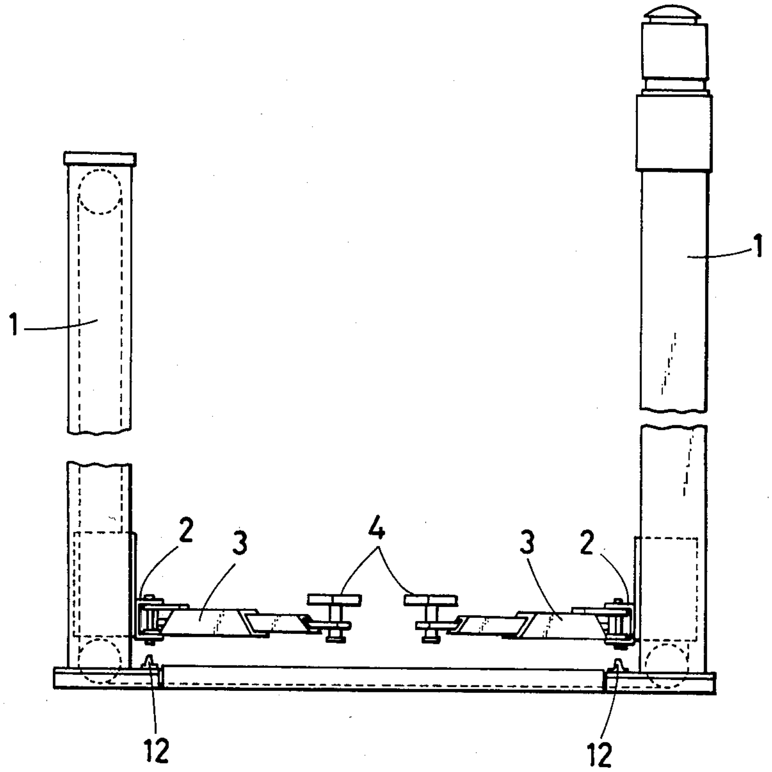
FIG. 1 is a front elevation of a two-post type lift apparatus provided with a swing arm storage mechanism according to the invention.
Figure 2:
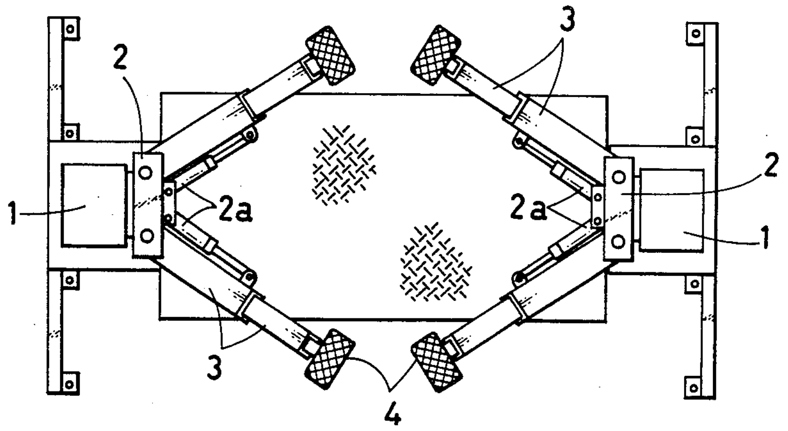
FIG. 2 is a plan view of the apparatus of FIG. 1.

Referring now to the drawings, particularly to FIGS. 1 and 2, a lift apparatus for use in repair of automobiles includes a pair of spaced apart posts 1,1 each having a carriage 2 connected thereto for vertical movement. The carriages 2,2 are adapted to vertically moved simultaneously with and equally to each other by certain operation mechanism (not shown). Since this operation mechanism is a conventional one and is not directly relevant to the present invention, a detailed description thereof will be omitted.

A pair of horizontal swing arms 3 are pivotally connected to each carriage 2 for swinging movement in a horizontal plane and in such a manner that they project toward the other pair of swing arms 3, the connection of the arms 3 to the carriage 2 being made on the lateral end portions thereof. Each swing arm pair 3 features, at the insides thereof, a means 2*a* for temporarily fixing the arm 3 in a certain horizontal position to provide a desired angle between the two arms 3. Each swing arm 3 is telescopically constructed so as to extend or retract in a horzontal plane. At the projecting end of the arm 3 is provided a means 4 for supporting the bottom of a car body. Adjustment of the angle between the swing arms 3 as well as of the projecting amount thereof will enable the suitable lifting points by the support means 4 to be set on the bottom of a particular automobile.

Figure 3:
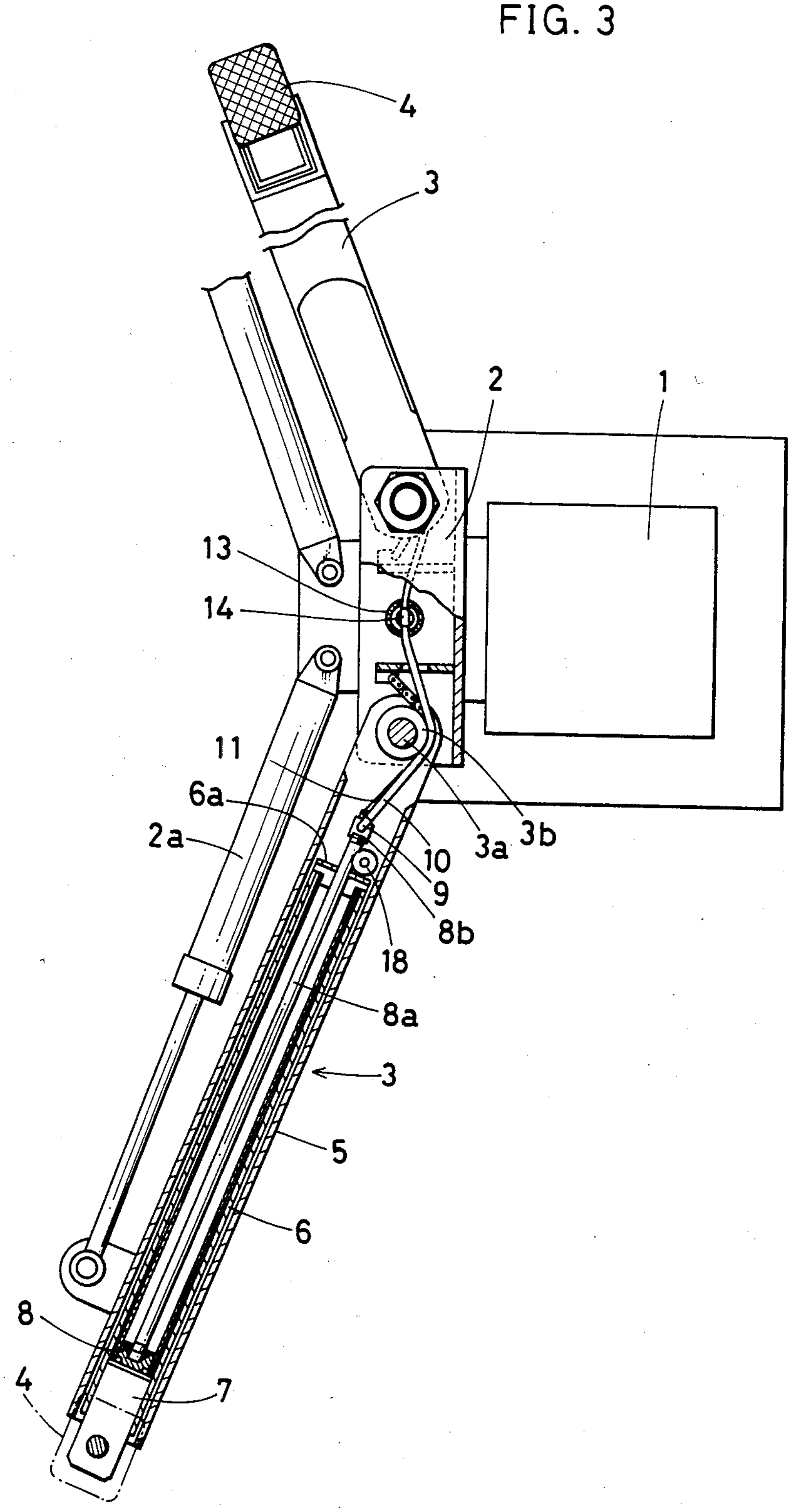
FIG. 3 is an enlarged partially-cutaway plan view, partly in section, of a pair of swing arms used for the apparatus of FIG. 1, which shows the inner construction of one of the swing arms in particular.
Figure 4:
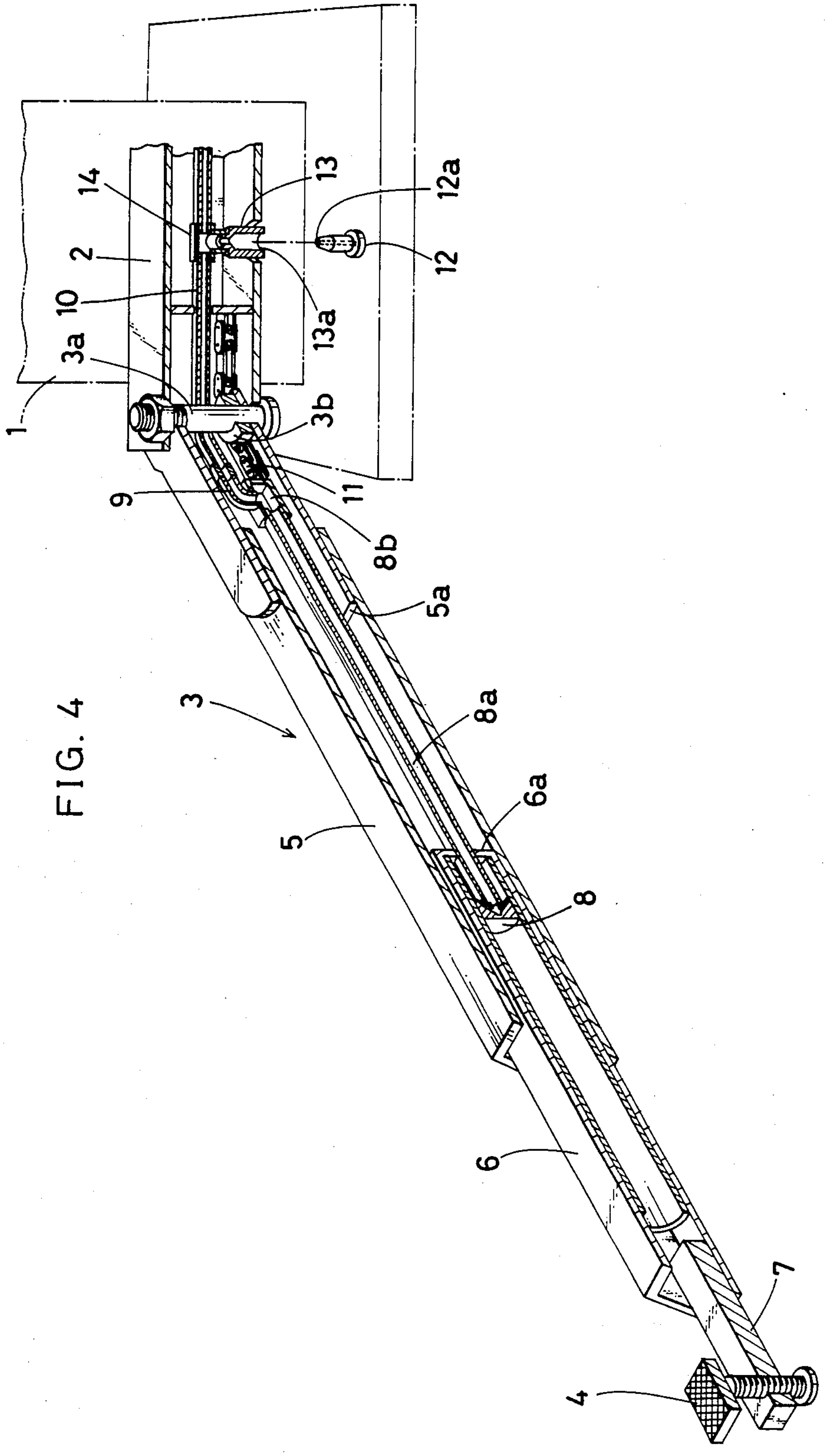
FIG. 4 is a vertical cross section of a swing arm of FIG. 3 which also illustrates the inner construction thereof.

Referring to FIGS. 3 and 4, description will next be made of a more detailed construction of the swing arm 3 as well as of a storing mechanism therefor. The 2-post type car lift apparatus described herein has four swing arms 3 in all, as will be clearly seen from the foregoing, but since all swing arms are of substantially the same constructions, the following description will be directed to only one of them, which description therefore is to be understood to generally represent those of the other ones as well.

The swing arm 3 comprises a first arm element 5 which is an elongate hollow element having a rectangular cross section and opened its outer end and a second arm element 6 which is likewise an elongate hollow element having a rectangular cross section, but shorter than the first arm element 5 by a certain length, and is supported by and fits inside the first one 5 through the open end thereof for sliding movement therein so that it can extent therefrom or retract thereinto. The first or support arm element 5 is connected, at it base end portion, to the carriage 2 by means of a pivotal pin 3*a*. The second or slidable arm element 6 also has an open outer end, and the foregoing car body support means 4 is secured to the open end portion thereof by means of a support bar 7 fixed to the element 6 through the open end thereof. The car body support means 4 is so threaded as to engage the support bar 7. The slideable arm element 6 has an inner cylinder closed by a wall 6*a* at its end nearer to the carraige 2. A piston 8 is slidably fitted into the cylinder, providing an air chamber between the piston 8 and the wall 6*a*. The wall 6*a* has an opening. A hollow piston rod 8*a* is coupled to the piston 8 and projects through the wall opening toward the carriage 2. In the wall opening, a sealer, packing and/or O-ring is provided between the portion of the piston rod 8a passing through the opening and the wall of the opening. Also, in the cylinder, a similar material or materials are provided around the piston 8. Thus, the air chamber is maintained sufficiently airtight. The connection of the hollow piston rod 8a to the piston 8 is made by attaching the forward end of the former to the inside of the latter, and the forward end of the rod 8a is opened in the position 8. The piston rod 8a is also opened at its backward end, which is connected to an air hose 19 by means of a piston rod end 8b and an elbow 9. The piston rod end 8b is connected to a portion of the carriage 2 by means of a chain 11 which connects them on opposite sides of the pivotal pin 3a. The chain 11 is in slight engagement with the circumference of the pivotal pin 3a while the swing arm 3 is being positioned in close proximity to the side of post 1. And as the swing arm 3 is swung inward, the chain 11 has a closer engagement therewith. The chain 11 may be directly with the pin 3a. In order to facilitate the swinging movement of the arm 3, however, the circumference of the pin 3a with which the chain is to be engaged may be increased by attaching an auxiliary means such as collar 3b or bearing to the pin 3a.

A step or stopper 5a is provided on the lower inside surface of the support arm element 5 for engaging the inner or backward end of the slidable arm element 6 to prevent it from further moving toward the carriage 2 beyond the stopper 5a. Preferably, the stopper 5a is so disposed that its outer or forward end is located at the distance equal to the entire length of slidable arm element 6, from the outer or open end of the support arm element 5. An elastic material may be attached to the outer end of the stopper 5a so as to absorb or reduce the shock produced when the arm element 6 engages or comes against it.

In FIG. 3, numeral 18 designates a guide roller for preventing the piston rod 8a from being curved.

Figure 5:
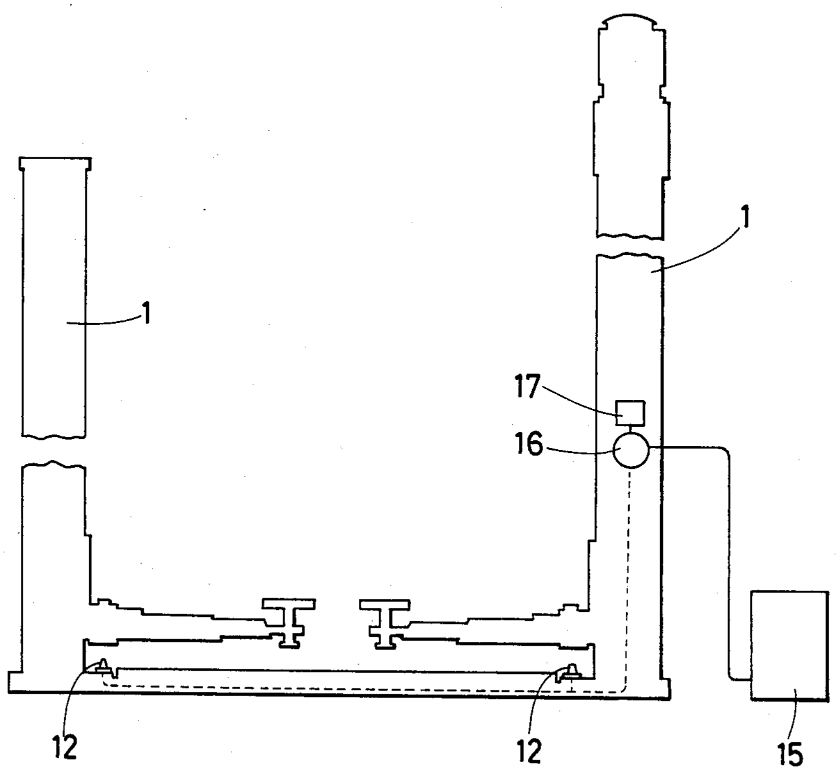
FIG. 5 shows an air line used for the storage of the swing arm.

Description will now be made of a mechanism for supplying air under pressure into the aforementioned air chamber. For supplying air thereinto, the aforementioned air hose 10 is directly connected to an air compressor 15 outside the lift apparatus (FIG. 5). The air compressor 15 may be switched on or off to control the air supply. If desired, however, an electromagnetic air valve may be provided somewhere along the air supply passage from the compressor to the air chamber, and the air supply may be controlled by switching on or off the air valve. For the embodiment described herein, an electromagnetic air valve is used, being disposed in such a position as designated by numeral 16 in FIG. 5.

In the particular embodiment described herein, the air supply mechanism is so adapted as to perform air supply when the carriage 2 has come to its lowest postion. For this purpose, on a base of the post 1 is provided an intermediate air supply means 12 projecting upward therefrom and having a generally conical upper portion at the top of which is formed an air supply port 12a which communicates with the air compressor 15. Correspondingly, a hollow air inlet means 13 is provided in the lower space within the carriage 2 and at a generally central portion thereof which coincides with the intermediate air supply means 12 on the post base. This air inlet means 13 has an open lower end 13a and the inner space thereof has a shape conforming to that of the air supply means 12 so that the latter means 12 fits into the air inlet means 13 when the carriage 2 is in its lowest position. Intermediate air supply means 12 and air inlet means 13 forms a quick disconnect coupling which is made or broken by the downward or upward movement of the carriage 2. Also in the inner space within the carriage 2 and above the air inlet means 13 is provided a coupling 14. An opening is formed through the upper end of the air inlet means 13 for allowing the inner space of the inlet means 13 to communicate with the coupling 14. The coupling 14 functions to separate the stream of air from the inlet means 13 into two branches so as to supply each branch of air stream into each one of the two swing arms that pair (FIGS. 3 and 4).

The intermediate air supply means 12 is connected to the air compressor 15 through an air hose (different from the air hose 10) and the electromagnetic air valve 16. Numeral 17 designates a switch for the air valve 16 which is adapted to be operated to control the air supply to the intermediate means 12.

Description will now be made of the use and operation of the present storage system as described above. An automobile is driven between the two posts for lifting. Then the swing arm 3 is swung or pivotally moved (from a level lower than the bottom of the automobile and from a horizontal position such as shown in FIG. 3) in an inward direction while extending the slidable arm element 6, so as to find a suitable lifting point. During this operation, in contrast with the forward movement (extension) of the slidable arm element 6 the piston 8 and its rod 8a move backward (, or toward the carriage 2) due to substantial engagement of the chain 11 with the circumference of the pivotal pin 3a as effected by the rotary (swinging) movement of the swing arm. Upon finding the suitable lifting point, the car body support means 4 is brought into contact with the bottom of the automobile body at that point. Then, the operation mechanism of the storage system is operated to lift the automobile.

After the automobile has been repaired in the lifted position, the carriage 2 is lowered with the automobile thereon. When the carriage comes to its lowest position, the intermediate air supply means 12 on the post base fits into the air inlet means 13 of the carriage. When the carriage is in this position, the car body support means 4 is no longer supporting the car body but is out of contact with its bottom, and in this condition the swing arm 3 can now be stored until its next use. In the embodiment herein, since the electromagnetic air valve 16 is disposed along the air supply line from the air compressor 15 to the intermediate air supply means 12, the air valve switch 17 must be activated in order to effect the air supply from the intermediate means 12. So, upon making sure the cartriage 2 has come to its lowest position, the switch 17 is activated. Then, the air from the compressor 15 flows under pressure through the intermediate means 12 into the air inlet means 13 and passes the coupling 14, air hose 10, elbow 9, piston rod end 8b and piston rod 8a and finally enters the air chamber defined by the piston 8 and the cylinder wall 6a in the slidable arm element 6, so as to urge the piston 8 forward and the cylinder wall 6a which forms the backward end of the slidable arm element 6) backward. However, since the slidable arm element 6 is so received in the support arm element 5 that the former may be moved (slided) with a relatively small force, the pressure of air supplied into the air chamber first acts to move the slidable arm element 6 backward until the cylinder wall 6a engages the stopper 5a in the support arm element 5. The slidable arm element 6 is thus retracted.

Upon retraction of the slidable arm element 6, the air pressure in the air chamber then acts to move the piston 8 forward, thereby pulling the chain 11, connected to the piston rod 8a, so that the entire swing arm 3 is turned outward about the pivotal pin 3a until it is substantially aligned with the other swing arm connected to the same carriage and turned simultaneously in the corresponding manner. Thus, the swing arm 3 is completely stored until its next use. If desired, the storage position of the swing arm at which to stop the outward movement thereof may be adjusted by providing a stopper therefor.

Upon storage, the air valve switch 17 is manually or automatically deactivated to stop the air supply, and then the automobile is removed from between the two posts 1,1.

As seen from the foregoing description, according to the present invention, the task of storing the swing arm, i.e., that of retracting the slidable arm element and moving aside the whole swing arm, may be made in a fully automatic manner only by operating the air supply switch (which may be a switch for the air compressor 15, rather than the air valve switch 17, as seen from the previous description). Thus, the time of period required for the entire car repair work may be remarkably shortened. This feature provides a distinctive advantage for continuous repair works of a number of automobiles.

Figure 6:
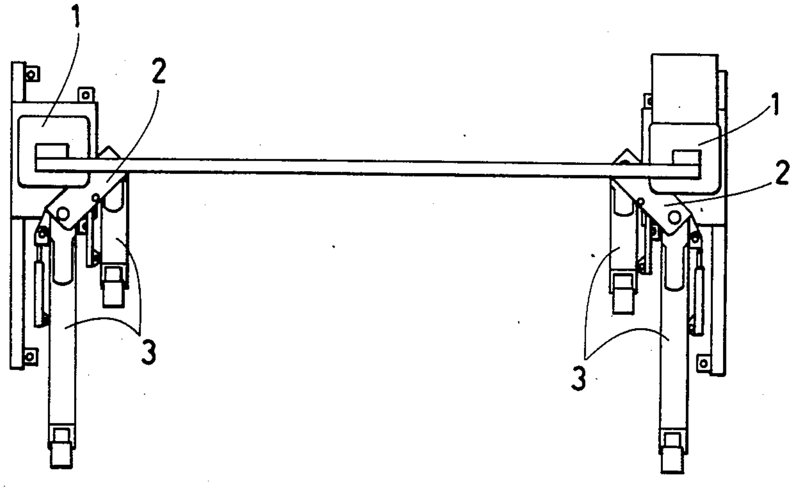
FIG. 6 shows a two-post lift apparatus employing another swing arm storage mechanism according to the invention.
Figure 7:
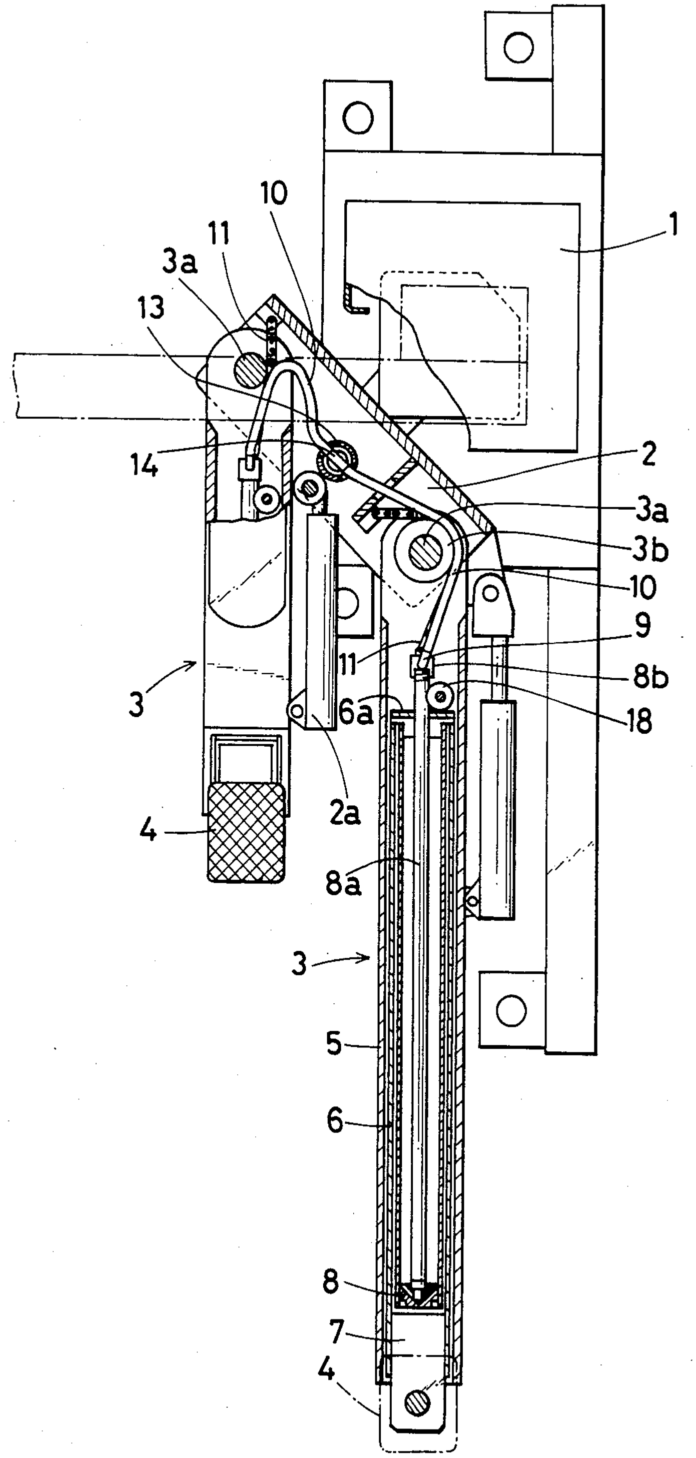
FIG. 7 is an enlarged partially-cutaway view, partly in section, of a pair of swing arms used for the apparatus of FIG. 6 which shows the inner construction of one of the swing arms in particular.

The storage mechanism according to the invention may be modified as shown in FIGS. 6 and 7. In these FIGS., a pair of spaced apart posts are provided with recesses which are firmed, respectively, in the front corners of the post facing each other. Each recess extends over the substantially entire length of post 1. A carriage 2 is coupled to the post 1 in the recess and is substantially obliquely disposed as viewed from above (FIG. 6), and is vertically movable along the recess. A pair of swing arms 3,3 are connected to the carriage 2 for vertical movement, one swing being of a longer length and the other being much shorter. The shorter swing arm is adapted to be swung, for storage, on the same side as the longer one. Therefore, while in the previous embodiment the manners of engagement of the chains for the two swing arms with the pivotal pins are symmetrical on the opposite sides of the center of the carriage, the manner of engagement of the chain 11 for the shorter swing arm with a pivotal pin 3a will be seen to be similar to that of another chain 11 for the longer swing arm with a corresponding pin 3a. With regard to the other respects, the construction of the second embodiment shown in FIGS. 6 and 7 is similar to that of the first one. In FIGS. 6 and 7, the same reference numerals designating features of the first embodiment refer to similar parts already described with respect to the first embodiment.

In the foregoing two embodiments of the invention, the swing arm comprises two individual elements, i.e., the support arm element pivotally connected to the carriage and another arm element, slidable in the support arm element. However, if desired, the swing arm may be formed of three individual arm elements at least two of which are constructed in the same manner as in the embodiments herein.

Also, a wire rope may be used, in place of a chain, for connecting the piston rod to the carriage. Moreover, it is possible to provide the forward opening of the piston rod in other portions of the piston rod wall than its end portion entering the piston.

Many other variations of the invention will be apparent to those skilled in the art. Accordingly, the invention is not considered to be limited to the specific embodiment described herein, but only as set forth by the appended claims.

What is claimed is:

1. In an apparatus for lifting automobile for repair thereof, comprising a pair of spaced apart posts each having a carriage which is connected thereto for vertical movement and each carriage includes a pair of horizontal swing arms pivotally connected thereto for swinging movement in a horizontal plane, each of said swing arms having a car body support means at its one end, and comprising at least two arm elements, wherein one of said arm elements comprises a substantially horizontal hollow support arm element connected to a pivot pin of said carriage and the other of said arm elements comprises a substantially horizontal telescopic arm element supported by said support arm element and slidable therein so as to extend therefrom or retract thereinto in a horizontal plane, an improvement characterized in that:

a. said slidable or telescopic arm element is a hollow element closed at the end thereof nearer to said carriage and having a hollow cylinder therein;
b. a hollow piston rod passes through said closed end of slidable arm element, a portion of said piston rod extending in said hollow cylinder and the other portion thereof extending in said hollow support arm element;
c. said hollow piston rod is opened at its both ends;
d. a piston is connected to the open end of said hollow piston rod in said cylinder, said piston being slidable in said cylinder;
e said piston and said closed end of said slidable arm element defines an air chamber between them in said cylinder;
f. a pressurized-air supply means is connected, through an air hose, to the open end of said hollow piston rod in said support arm element, so that the air under pressure may be supplied from said supply means through said hollow piston rod into said air chamber, thereby moving slidable arm element and said piston relative to each other;
g. said piston rod is also connected to said carriage by means of an interconnection means which is fixed, at its one end, to the end of said piston rod in said support arm element and is engaged, at a portion of its middle section, with a portion of said pivotal pin of said carriage and is secured to another portion, excepting said pivotal pin, of said carriage; and
h. said support arm element is provided, on its inner surface, with a means for preventing said slidable arm element from moving or sliding, in said support arm element, toward the carriage beyond a given point.

2. An improvement of claim 1 wherein said carriage is connected to the post at certain angles thereto and one is said swing arms is shorter than the other swing arm by an appreciable distance.

* * * * *

UNITED STATES PATENT AND TRADEMARK OFFICE

CERTIFICATE OF CORRECTION

PATENT NO. : 4,679,660
DATED : July 14, 1987
INVENTOR(S) : Koichi Suzuki

It is certified that error appears in the above-identified patent and that said Letters Patent is hereby corrected as shown below:

Column 1, line 23, replace "connect" with --connected--.

Column 1, line 31, replace "toward" with --to--.

Column 1, line 67, replace "a" with --the--.

Column 2, line 15, replace "to" with --to be--.

Column 2, line 49, replace "its" with --at its--.

Column 3, line 11, replace "position" with --piston--.

Column 3, line 19, before "post" insert --the--.

Column 3, line 21, before "directly" insert --engaged--.

UNITED STATES PATENT AND TRADEMARK OFFICE
CERTIFICATE OF CORRECTION

PATENT NO. : 4,679,660

DATED : July 14, 1987

INVENTOR(S) : Koichi Suzuki

It is certified that error appears in the above-identified patent and that said Letters Patent is hereby corrected as shown below:

Column 4, line 24, after "Then" insert --,--.

Column 4, line 26, before "shown" insert --that--.

Column 4, line 31, before "or" delete --,--.

Column 4, line 54, replace "cartriage" with --carriage--.

Column 4, line 66, replace "small" with --smaller--.

Column 5, line 34, replace "firmed" with --formed--.

Column 5, line 37, before "post" insert --the--.

Column 5, line 42, before "being" insert --arm--.

Column 5, line 50, before "chain" replace "the" with --a--.

UNITED STATES PATENT AND TRADEMARK OFFICE
CERTIFICATE OF CORRECTION

PATENT NO. : 4,679,660
DATED : July 14, 1987
INVENTOR(S) : Koichi Suzuki

It is certified that error appears in the above-identified patent and that said Letters Patent is hereby corrected as shown below:

Column 6, line 1, before "chain" replace "a" with --the--.

Column 6, line 12, before "automobile" insert --an--.

Column 6, line 40, replace "e" with --e.--.

Column 6, line 45, after "so that" delete "the".

Column 6, line 48, before "slidable" insert --said--.

Column 6, line 64, after "one" replace "is" with --of--.

Signed and Sealed this

Nineteenth Day of January, 1988

*Attest:*

DONALD J. QUIGG

*Attesting Officer*

*Commissioner of Patents and Trademarks*